United States Patent [19]
Höckele et al.

[11] 3,878,259
[45] Apr. 15, 1975

[54] PROCESS FOR MANUFACTURING CUMENE

[75] Inventors: Günter Höckele; Wilhelm Knepper, both of Marl, Germany

[73] Assignee: Chemische Werke Huls Aktiengesellschaft, Marl, Germany

[22] Filed: Apr. 15, 1974

[21] Appl. No.: 460,679

[30] Foreign Application Priority Data

Apr. 21, 1973 Germany.............................. 2320385

[52] U.S. Cl. ............. 260/667; 260/683.9; 252/459; 208/143
[51] Int. Cl.......................... C07c 5/10; C07c 7/00
[58] Field of Search............ 260/667, 668 R, 683.9; 252/459

[56] References Cited
UNITED STATES PATENTS

| | | | |
|---|---|---|---|
| 3,268,608 | 8/1966 | Rosset................... | 260/668 |
| 3,433,845 | 3/1969 | Kovach et al...................... | 260/667 |
| 3,551,511 | 12/1970 | Aglietti et al.................... | 260/683.9 |
| 3,769,358 | 10/1973 | Neta et al.......................... | 260/667 |

FOREIGN PATENTS OR APPLICATIONS

| | | | |
|---|---|---|---|
| 1,468,895 | 11/1967 | France................................ | 260/667 |
| 2,284,261 | 11/1958 | Australia............................ | 260/667 |

OTHER PUBLICATIONS

"Encyclopedia of Chem. Technology," 2nd Ed., Vol. 6 (1965), pp. 543–546.
"Encyclopedia of Chem. Technology," 2nd Ed., Vol. 11 (1966), pp. 426–428.
"Encyclopedia of Chem. Technology," 2nd Ed., Vol. 19 (1969), pp. 80–83.

*Primary Examiner*—Delbert E. Gantz
*Assistant Examiner*—Juanita M. Nelson
*Attorney, Agent, or Firm*—Krafft & Wells

[57] ABSTRACT

A process for the manufacture of cumene by hydrogenating alpha-methylstyrene with hydrogen in the presence of an alkalinated nickel aluminum oxide carrier catalyst, the improvement comprising, carrying out the hydrogenation at temperatures of about 60°–160°C in the presence of a catalyst where the carrier material contains kappa and/or delta aluminum oxide having an alkali content of 0.1 – 5 percent by wweight of alkali oxide, wherein (if appropriate) molded aluminum hydroxide containing alkali is dried in a known manner, then it is heated in an air stream at about 400°– 500°C and thereafter steam treated at about 700°– 800°C. The calcined catalyst is then impregnated with a nickel salt in a conventional manner, the salt subsequently being completely decomposed into nickel oxide and volatile components, the nickel content of the catalyst (computed as nickel metal) being about 5 – 12 percent by weight referred to the calcined catalyst. The impregnated catalyst is thereupon reduced in a conventional manner.

9 Claims, No Drawings

PROCESS FOR MANUFACTURING CUMENE

BACKGROUND OF THE INVENTION

The present invention relates to a process for the manufacture of cumene by hydrogenating alpha-methylstyrene with hydrogen in the presence of an alkalinated nickel-aluminum oxide carrier catalyst.

The state of the art may be ascertained by reference to Kirk-Othmer "Encyclopedia of Chemical Technology," 2nd Edition, Vol. 6 (1965), pp. 543 – 546 under the section CUMENE; Vol. 11 (1966), pp. 426 – 428, under the section "The Catalyst and Its Resistance to Nitrogen and Sulfur;" Vol. 19 (1969), pp. 80 – 83, particularly page 82; U.S. Pat. Nos. 3,268,608 and 3,551,511, and French Pat. No. 1,468,895; the disclosures of which are incorporated herein.

When phenol is manufactured from cumene by acid dissociation of cumene hydroperoxide, alpha-methylstyrene is obtained which is produced together with the non-converted cumene. This alpha-methylstyrene, which is present in the "crude cumene" in proportions of about 10 percent by weight, is appropriately hydrogenated back to cumene.

It is known to carry out this hydrogenation in the liquid phase. The catalysts used are sulfided nickel, platinum or palladium carrier catalysts, or cobalt-molybdenum carrier catalysts. Silicic acid, pure clay, aluminum silicates or activated carbon serve as catalyst carriers. These catalysts in general completely hydrogenate the alkenyl lateral chain without attacking the benzene nucleus. In the process described in U.S. Pat. No. 3,551,511, the crude cumene obtained in phenol production is hydrogenated in the presence of a cobalt-molybdenum catalyst or a nickel-cobalt-molybdenum catalyst on aluminum oxide at temperatures of 250°–300°C and pressures of 0.5 – 70 atmospheres. The high temperature of hydrogenation is a drawback. In the process of U.S. Pat. No. 3,268,608 a catalyst of which the active ingredient contains the metals of the platinum group or nickel is used on an alkalenated clay or activated carbon carrier is used for the hydrogenation of alpha-methylstyrene and this catalyst must be sulfided prior to use. The hydrogenation takes place at temperatures of 100°– 300°C, generally at 175°–225°C, and at pressures of 2 – 100 atm., generally 20 – 50 atm. This hydrogenation yields dimers and polymers as undesired side products. The example of U.S. Pat. No. 3,268,608 shows that the hydrogenation of a mixture of cumene and alpha-methylstyrene with an alkalinated clay carrier catalyst yields 10 percent by weight of high boiling point side products with respect to the alpha-methylstyrene input. Again, high boiling point products are obtained when a palladium activated carbon catalyst is used in conformity with the description of French Pat. No. 1,468,895. These high boiling point products are useless and bothersome side products which can no longer be converted into cumene and which lower the economic yield of the process.

SUMMARY OF THE INVENTION

Having in mind the limitations of the prior art, it is an object of the present invention to use catalysts in the hydrogenation of alpha-methylstyrene to cumene in the absence of the formation of bothersome side products such as those having high boiling points or those wherein the aromatic nucleus is completely hydrogenated, for instance isopropylcyclohexane, these catalysts also having good hydrogenation efficiency.

According to the present invention, a process for the manufacture of cumene by hydrogenating alpha-methylstyrene with hydrogen in the presence of an alkalinated nickel-aluminum oxide carrier catalyst was found, which is characterized in that the hydrogenation is carried out at temperatures of about 60°–160°C in the presence of a catalyst containing kappa and/or delta aluminum oxide, with an alkali content of 0.1 –5 percent by weight of alkali-oxide, as carrier material. The alkali containing aluminum hydroxide (which may be molded), is treated in known manner, that is, dried, then heated to 400°–500°C in an air stream and then treated with steam at 700°–800°C and impregnated in a manner known per se with nickel salt which thereupon is completely decomposed into nickel oxide and volatile components. The nickel content of the catalyst (computed as nickel metal) is 5 –12 percent by weight with respect to the calcined catalyst. The calcined catalyst is thereafter reduced in known manner prior to use.

Precipitated aluminun hydroxide or aluminumm oxide gel are mixed, preferably with aqueous alkali solution, and corresponding to the desired alkali content, for the preparation of the carrier. Preferably aqueous solutions of sodium hydroxide are used, but also aqueous solutions of lithium hydroxide or potassium hydroxide are useful. Mixing of the aluminum hydroxide or aluminun oxide gel with the alkali solution is performed in such manner that the carrier material contains about 0.1 –5 percent by weight of alkali (computed as alkali oxide) with respect to the calcined carrier. If one goes below the lower limit of 0.1 percent by weight, then the formation of the high boiling point products is no longer completely prevented. The upper limit of 5 percent by weight in alkali content is determined by the negative influence of high alkali contents on the physical properties of the catalyst carrier, the catalytic effect in such cases being visibly decreased. The alkali-containing aluminum hydroxide is generally moistened with diluted nitric oxide in order to improve the plastic properties, and then it is molded into strands or tablets and dried at about 100°–150°C. Graphite may also be added in order to improve the plastic properties. The internal surface area and the pore distribution of the carrier, also the structure of the aluminum oxide, is controlled by subsequent heating in an air stream at about 400°–500°C and an ensuing steam treatment at about 700°–800°C. The carriers prepared in conformity with the present invention as a rule have internal specific surfaces of about 20 – 200 sq.m/gm, a pore volume of about 0.3 – 0.7 ml/gm and an average pore diameter of about 100 – 400 A. The operation of the present invention with carriers of internal specific surfaces of about 60 – 100 sq.m/gm, pore volumes of about 0.4 – 0.5 ml/gm and average pore diameters of about 200 – 300 A, was found to be particularly suitable. Such carriers are obtained by heating the dried, molded items to about 410°–440°C and by treating them with steam at about 740°–760°C. Preparation of the catalyst is achieved by impregnating the carrier of the invention with nickel salt solutions, preferably with a nickel nitrate solution, by drying the molded items generally at 100°–150°C and by completely decomposing the nickel salt preferably at about 300°–400°C. Impregnation is carried out in such manner that the calcined catalyst contains nickel to the extent of about , – 12 percent by weight (calculated as nickel metal). The lower limit is determined by the inadequate catalytic activity resulting from low nickel content catalysts. The higher nickel contents reduce selectivity.

Those nickel salts are used for impregnation, which are completely decomposed to nickel oxides and to volatile components at 300°–400°C. If nickel salts which are already completely decomposing below 300°C are used, then one may easily obtain catalysts that are over-active. Vacuum impregnation is advantageous because the air already expelled from the pores and coating by means of the active catalyst component takes place more rapidly.

If desired, the properties of the catalyst may be modified by adding further metals, especially copper or copper and chromium. These metals are sprayed on the carrier in the form of aqueous nitrate solutions of copper and of chromic acid in the case of chromium.

Prior to use, the catalyst is reduced at about 250°–400°C. The nickel in the reduced catalyst is hydrogenation effective and is predominantly in the elementary metallic form.

The nickel salts include but are not limited to $Ni(NO_3)$, usefull are as well Ni-complex-salts as for example $Ni(NH_3)_6CO_3$ and $Ni(NH_3)_6(OH)_2$ In the hydrogenation the feed rate of alpha-methylstyrene is about 0.1 to 1 volumes of alpha-methylstyrene per volume of carrier catalyst per hour and the feed rate of hydrogen is about 100 to 3,000 volumes of hydrogen per volume of carrier catalyst per hour.

In conformity with the process of the present invention, pure alpha-methylstyrene or mixtures of alpha-methylstyrene and cumene as yielded in the production of phenol may be used. Fairly large amounts of contaminants may be present in the input mixture. Typical impurities in the mixture of alpha-methylstyrene/cumene are phenol: up to about 5 percent; butyl benzene: up to about 4 percent; ethyl benzene: less than 1 percent; cyclohexanol: less than 1 percent; acetone: less than 1 percent; isopropylcyclohexane: less than 0.1 percent; and sulfur and chlorine in ppm.

Generally the hydrogenation of the present invention takes place at pressures of about 1 – 30 atm. and at temperatures of about 60°–160°C. In contrast to the process of the known state of the art, the catalyst of the present invention is already fully active at 60°C. The starting temperature in the freshly reduced or regenerated state in fact is only 40°C. For good activity to be maintained over a long duration of operation, the temperature is raised. As a rule, the temperature is raised to 160°C. Damage to the catalysts may occur above 160°C, and they may lose their original properties, so that the aromatic nucleus of the alpha-methylstyrene is partly thoroughly hydrogenated. The catalysts are used for several years when they are regenerated following operation times of 4 – 8 months, the catalysts being heated to about 300°–400°C in an atmosphere of molecular hydrogen.

The process of the present invention offers the advantage as contrasted with the state of the art that because of the selection of the process parameters in the preparation of the catalyst, application of the latter during hydrogenation completely suppresses the formation of useless side products such as those of higher boiling points and those in which the aromatic nucleus of alpha-methylstyrene is thoroughly hydrogenated, the bothersome sulfiding step (such as required for instance by U.S. Pat. No. 3,268,608) becoming superfluous, and operation at low temperatures is feasible.

The following Examples are given to illustrate the process of the present invention.

EXAMPLE A

Aluminum hydroxide is moistened by means of aqueous sodium hydroxide (0.6 kg of $NaOH/100$ kg of $Al_2O_3$) and of dilute nitric acid, extruded, the strands being dried at 130°C, calcined at 420°C and treated with steam at 750°C. The catalyst carrier so prepared is subjected to vacuum, impregnated by means of a hot, concentrated nickel nitrate solution, then dried at 140°C and calcined at 350°C. Prior to use, the catalyst is reduced at 350°C in a nitrogen-hydrogen gas stream.

EXAMPLE B

Aluminum hydroxide is moistened with dilute nitric acide, extruded, the strands are dreid, calcined and steam treated at 130°, 420°and 750°C respectively. The catalyst carrier is impregnated under vacuum with hot, concetrated nickel nitrate solution, dried at 140 °C, calcined at 350 °C and reduced in situ with a nitrogen-hydrogen gas at 350 °C.

EXAMPLE C

Nickel oxide prepared from precipitaed basic nickel carbonate at a temperature no more than 300°C is mixed with graphite and alkalinated aluminum oxihydrate, compressed into tablets, dried at 150°C, calcined at 350 °C and reduced in situ with nitrogen-hydrogen gas at 350 °C.

EXAMPLE 1

Alpha-methylstyrene (content: 98.74 percent by weight) was hydrogenated at standard pressure at 100°C and at a ratio of one part by volume of alpha-methylstyrene to one part by volume of catalyst per hour in a hydrogen stream of a rate of 2,000 parts by volume per hour, with respect to the standard conditions, on a reduced carrier catalyst (prepared per method A) containing 10.5 percent by weight of nickel, 85.5 percent by weight of aluminum oxide and 0.4 percent by weight of sodium oxide in the calcined state. 98.7 parts by weight were hydrogenated to cumene. Dimers and polymers did not arise even in traces. Nor was there any formation of isopropylcyclohexane.

EXAMPLE 2

A crude cumene such as is ordinarily obtained from the phenol-cumene process, and with a content of 10 parts by weight of alpha-methylstyrene, was hydrogenated at standard pressure at 100°C at a loading of 3 parts by volume of liquid cumene to 1 part by volume of catalyst per hour in a hydrogen stream of 2,000 parts by volume per hour, with respect to standard conditions, on the same catalyst as in Example 1. 9.6 parts by weight of alpha-methylstyrene were hydrogenated to cumene and 0.4 parts by weight remained unchanged. There was no dimer, not even in traces.

EXAMPLE 3

A catalyst prepared per Example A was used to hydrogenate crude cumene at a temperature of 70°C and a pressure of 10 atm. gauge. The alpha-methylstyrene (10 percent by weight) was completely hydrogenated to cumene. Dimers could not be found, not even in traces. The hydrogenation temperature was gradually raised to 160°C over an operational period of 8 months. No dimer formation could be shown upon the increase of the non-hydrogenated alpha-methylstyrene to 0.6 percent by weight, whereupon the catalyst was regenerated and again used at about 70°C. The results obtained were repetitive over 7 cycles of operation and regeneration. The same results are obtained when the hydrogenation is carried out at 20 atm.

COMPARISON EXAMPLE 1

Under the same conditions as described in Example 2, crude cumene is hydrogenated by means of a reduced nickel-aluminum-oxide carrier catalyst prepared per Example B and containing 10.7 percent by weight of nickel, 85.7 percent by weight aluminum oxide, and 0.008 percent by weight sodium oxide in the calcined state. 9.2 parts by weight of alpha-methylstyrene were hydrogenated to cumene, 0.6 percent by weight formed dimer products and 0.2 percent by weight remained unchanged.

COMPARISON EXAMPLE 2

Crude cumene at 100°C and normal pressure was hydrogenated with a loading of 3 parts by volume of liquid cumene to one part by volume of catalyst per hour using a catalyst prepared per Example C but containing 21 percent by weight nickel, in a hydrogen stream of 2,000 parts by volume per hour, referred to standard conditions. The alpha-methylstyrene was completely hydrogenated. No dimers could be shown, but there were 0.4 percent by weight of isopropylcyclohexane from cumene nulear hydrogenation.

We claim:

1. In the process for manufacturing cumene by hydrogenating alpha-methylstyrene with molecular hydrogen in the presence of an alkalinated nickel aluminum-oxide carrier catalyst, the improvement comprising: said carrier containing calcined alkalinated aluminum oxide selected from the group consisting of kappa aluminum oxide, delta aluminum oxide and mixtures thereof and having an alkali content of about 0.1 – 5 percent by weight of alkali oxide, said calcined carrier is impregnated with nickel catalyst wherein the nickel content is about 5 – 12 percent by weight, calculated as nickel metal and based upon the total weight of said calcined carrier, and said hydrogenating is carried out at temperatures of about 60° – 160°C.

2. The process of claim 1, wherein said aluminum oxide carrier has an internal specific surface of about 20 – 200 sq.m/gm and an average pore volume of about 0.3 – 0.7 ml/gm, and an average pore diameter of 100 – 400 A.

3. The process of claim 2, wherein said hydrogenating is carried out at pressures of about 1 to 30 atmospheres.

4. The process of claim 3, wherein said calcined carrier is prepared by molding aluminum hydroxide containing said alkali, drying, heating in an air stream at about 400°–500°C and steam treating at about 700°–800°C.

5. The process of claim 4, wherein said nickel impregnated carrier catalyst is prepared by impregnating said calcined carrier with a nickel salt, decomposing said salt into nickel oxide and volatile components and reducing said nickel oxide to predominantly nickel metal.

6. The process of claim 5, wherein said impregnating is carried out under vacuum.

7. The process of claim 6, wherein said decomposing is conducted at a temperature of about 300°–400°C.

8. The process of claim 7, wherein said nickel salt is nickel nitrate.

9. The process of claim 8, wherein the feed rate of alph-methylstyrene is about 0.1 to 1 volumes of alpha-methylstyrene per volume of carrier catalyst per hour and the feed rate of hydrogen is about 100 to 3,000 volumes of hydrogen per volume of carrier catalyst per hour.

* * * * *